Sept. 22, 1953        P. E. WAGNER        2,652,808
AUTOMATIC CHAIN CONVEYER TYPE POULTRY FEEDER
Filed Aug. 8, 1949        2 Sheets-Sheet 1
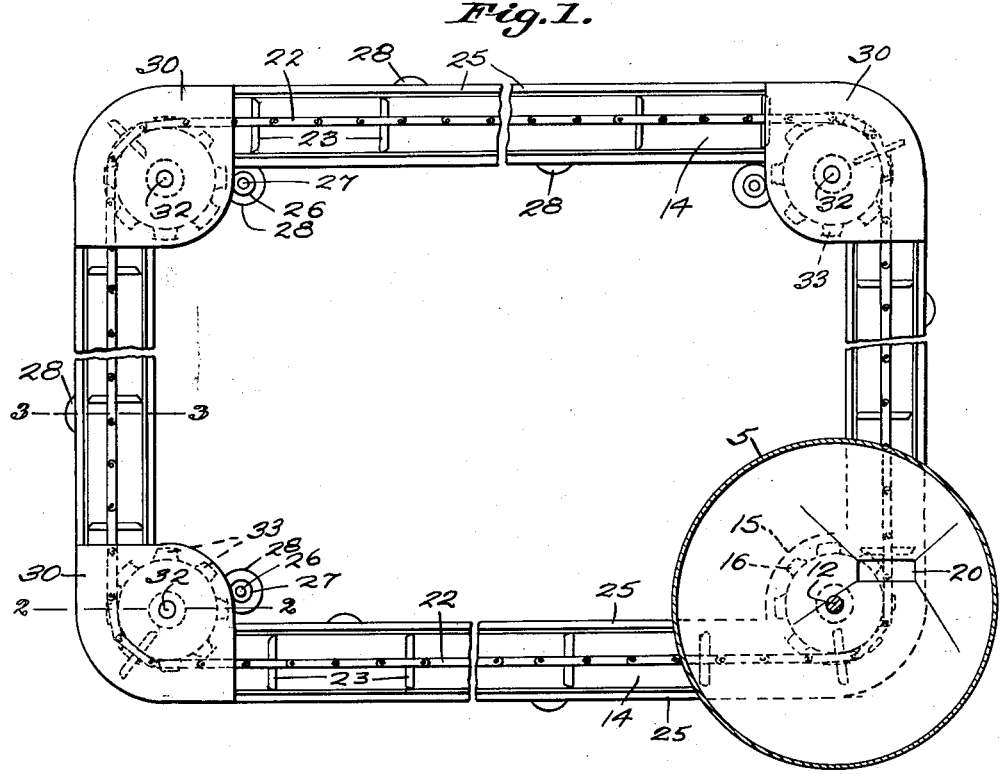
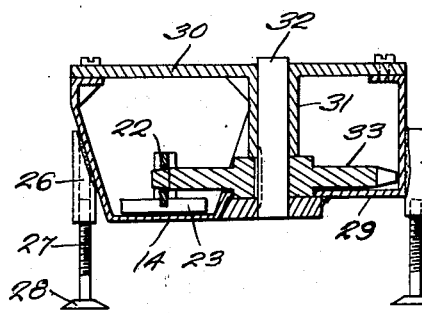
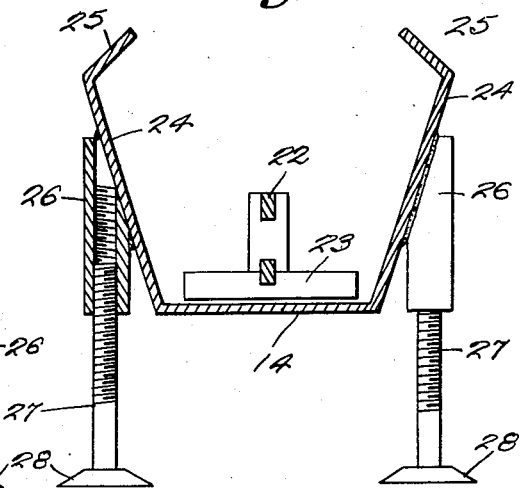
Paul E. Wagner INVENTOR
BY *C. A. Snow & Co.*
ATTORNEYS.

Sept. 22, 1953 P. E. WAGNER 2,652,808
AUTOMATIC CHAIN CONVEYER TYPE POULTRY FEEDER
Filed Aug. 8, 1949 2 Sheets—Sheet 2
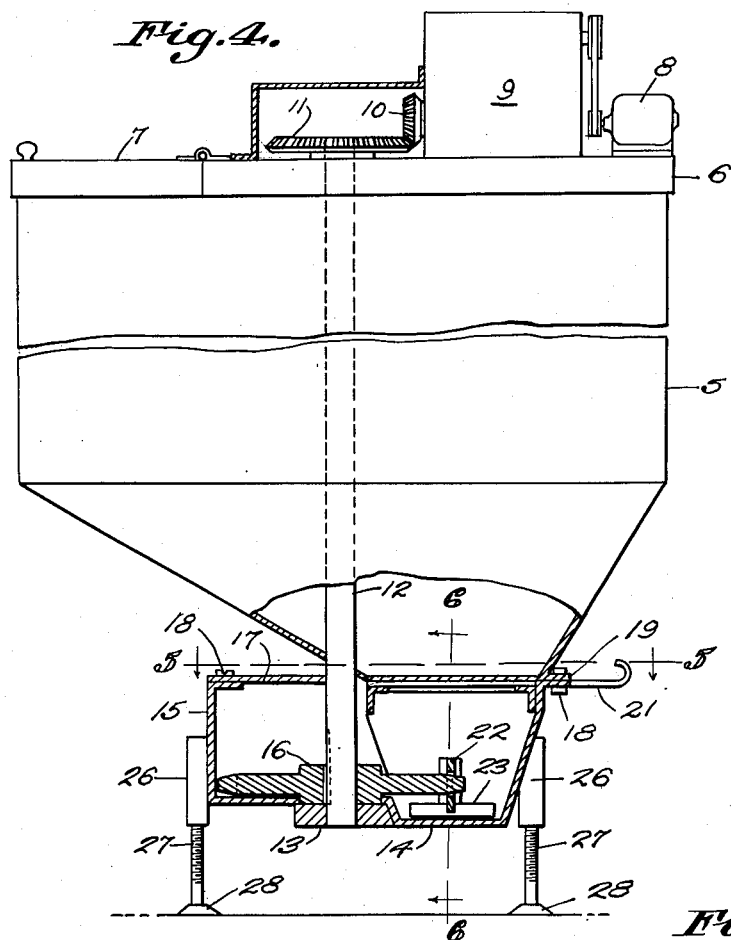
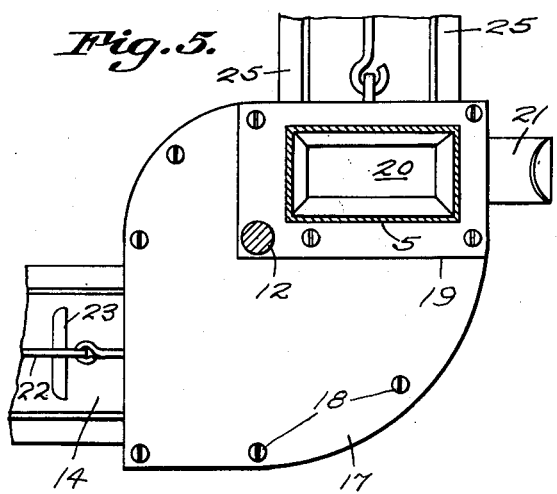
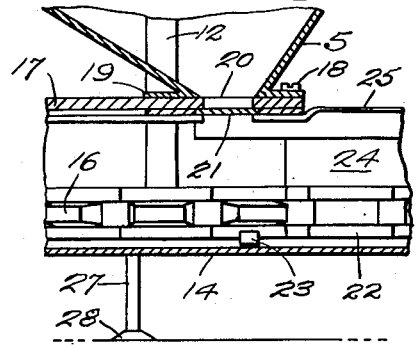
Paul E. Wagner
INVENTOR
BY C. A. Snow & Co.
ATTORNEYS.

Patented Sept. 22, 1953

2,652,808

UNITED STATES PATENT OFFICE 2,652,808

AUTOMATIC CHAIN CONVEYER TYPE POULTRY FEEDER

Paul E. Wagner, Beaver Springs, Pa.

Application August 8, 1949, Serial No. 109,151

1 Claim. (Cl. 119—52)

This invention relates to a feeder construction for poultry, and more particularly to a conveyor structure for poultry feed troughs, adapted to supply feed automatically and continuously to the poultry.

An important object of the present invention is to provide a feed conveyor structure of novel design, which will permit the feed to be deposited at periodic intervals in a single hopper, and which will thereafter convey said feed throughout the entire length of an elongated feed trough, whereby to continuously supply feed to a large flock of poultry.

Another important object is to provide, in a structure of the type stated, a conveyor construction wherein a novelly designed form of endless horizontal conveyor chain will have a wiping action over the bottom of the feed trough, so as to efficiently move all the feed throughout the length of said trough, and so as to cause the wiping or supply portion of said conveyor to be positioned clear of drive sprockets for the conveyor, thus to permit training of the conveyor around sharp corners and in any direction desired according to the construction of the particular feed trough.

Summarized briefly, the invention comprises an elongated endless feed trough, which would be of sufficient size generally to permit a large number of poultry to feed thereat at the same time; a hopper located at one point along the feed trough, and disposed to continuously permit feed to fall by gravitation into the trough; a conveyor chain of endless formation extending throughout the length of the feed trough and novelly designed to wipe over the bottom of the feed trough so as to move feed throughout the length of said trough; means for driving the chain; and idler sprockets located at the several bends in the feed trough around which said chain passes.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Fig. 1 is a top plan view of a feed conveyor structure constructed in accordance with the invention, a hopper being shown in horizontal section.

Fig. 2 is an enlarged section on line 2—2 of Fig. 1.

Fig. 3 is a section, still further enlarged, taken on line 3—3 of Fig. 1.

Fig. 4 is a section through one corner of the feed trough, showing the hopper and drive means.

Fig. 5 is a section on line 5—5 of Fig. 4.

Fig. 6 is a section on line 6—6 of Fig. 4.

Referring to the drawings in detail, 5 is a hopper of any suitable size, fitted at its top with a cover 6 having hinged thereto the lid 7 for filling of the hopper at suitable levels with a supply of poultry feed, there being mounted on the cover 6 the electric motor 8 adapted to drive, through a reduction gear box 9, a gear 10 that is in mesh with the gear 11 secured to the upper end of the vertical drive shaft 12 extending downwardly through the hopper 5 and journaled at its lower end in a bearing plate 13 secured fixedly to the bottom of the endless feed trough 14. The feed trough 14, as seen from Fig. 1, is in the illustrated example rectangular in form. However, it can be of any desired conformation, the illustration merely showing a presently preferred example. In the illustrated example, as may be noted, the hopper 5 is disposed at one of the four corners of the endless rectangular feed trough 14, and that corner where the hopper is located is formed with an inwardly extended sprocket housing 15 in the bottom of which is horizontally positioned the drive sprocket 16 keyed to the shaft 12 so as to be driven thereby. The sprocket housing 15 and the communicating corner of the endless trough 14 are fitted with a cover 17 which is secured in place by bolts 18, some of said bolts 18 also serving to secure to the top portion of the cover 17 and trough the rectangular bottom flange 19 formed on the tapered lower end of the hopper 5, said tapered lower end of the hopper being formed with the small outlet opening 20 through which feed is adapted to gravitate into the feed trough 14.

When desired, the opening 20 can be closed by the slide 21. Normally, however, after the hopper 5 is filled the slide 21 is pulled open and left open, so that the feed contained within the hopper will be free to gravitate to the feed trough 14.

An endless conveyor chain 22 is preferably formed of rectangular links set vertically or edgewise in the bottom of the trough 14 and having rectangular openings into which the teeth of the drive sprocket 16 and of other idler sprockets to be described hereinafter, can extend for the purpose of driving the chain.

Secured rigidly to certain of the links 22 are the upstanding cross bars 23 extending transversely of the trough 14, almost from side wall to side wall of said trough. Said cross bars 23, as may be noted, have a wiping action over the floor of the trough, and are secured to the bottoms of the vertical apertured chain links 22.

Referring now to Fig. 3, as previously noted the cross bars 23 extend substantially from side to side of the trough 14. At its sides, the trough 14 is provided with the inclined side walls 24, merging into the inclined and inwardly extended flanges 25.

The entire structure is adapted to be supported at adjustable heights from the floor, thus to meet varying conditions according to the size of the chickens or turkeys or other fowl to be fed. To this end, I provide at intervals longitudinally of the endless trough 14 the vertical tubes 26, that are secured in any suitable manner fixedly to the outer surfaces of the side walls of the trough, as by welding or the like. These tubes 26 have threaded bores, in which are received the threaded studs 27 at the lower ends of which are provided the feet 28.

As may be readily observed, the studs or bolts 27 can be threaded adjustably within the tubes 26, so as to vary the height of the trough 14 from the floor of the structure in which the trough is located. Obviously, if the birds in the particular flock are very young, the trough might be positioned quite low. As the birds grow, the trough is adjusted upwardly. Or, if large birds such as turkeys or the like are being fed, the trough might be positioned still higher.

Referring now to Fig. 2, each of the other corners of the feed structure is also provided with an inwardly extended housing 29 communicating with feed trough 14, these other housings 29 being provided with covers 30, that are provided either integrally or otherwise with the bearings 31 in which are journaled the shafts 32 to which are keyed the idler sprockets 33 around which are trained the conveyor chain links 22.

I believe the operation and advantages of the construction may now be readily noted. The construction avoids the hand feeding of the birds, since the user simply, at periodic intervals, fills the hopper 5 with a supply of feed. The slide 21, in this connection, is adapted to be adjustably positioned relative to the opening 20, so as to cover all or part of the opening. Or, the slide can be pulled completely out so as to expose the opening 20 to its full area. By reason of this arrangement, the amount of feed permitted to gravitate through the opening 20 is regulated according to the size of the particular birds being fed or the number of birds in the flock. As the birds grow and require more feed, the slide 21 can be opened more and more until ultimately the opening 20 is fully exposed.

In any event, the conveyor chain is generally permitted to operate continuously, and by reason of the reduction gearing will of course move very slowly through the feed trough 14. As the conveyor chain operates, feed gravitating through the opening 20 drops to the chain in advance of the drive sprocket 16 so that said drive sprocket 16 is substantially clear of feed. As the feed gravitates through the opening 20, the wiper bars or flights 23 continually passing under said opening convey the feed away and move it along the trough 14 so that ultimately said feed is carried throughout the entire length of the trough. In this connection, it may be readily noted that the wiper bars or flights 23 are completely out of the way of the sprocket and chain engagement, and the chain is permitted to be trained in any direction, according to the shape of the particular feed trough, while in all cases the wiper bars wipe along the floor of the trough so as to efficiently convey the feed to the birds.

In this connection, it has been found in practice that the feed will not foul the sprockets, since in practically all instances, the level of the feed will be below the level of the sprockets. However, even though feed does move into the sprocket housings, it does not affect the efficiency of the operation in any way.

What is claimed is:

In a poultry feeder of the type comprising an endless horizontal elongated trough having a flat bottom and upwardly extending side walls carried by the longitudinal side edges of the bottom, which side walls diverge as they recede from the bottom, and means mounted above the trough for feeding material into said trough, means for distributing the material fed into the trough throughout the length thereof comprising longitudinally spaced guide sprockets mounted adjacent one side of the trough to rotate about vertical axes, said sprockets extending into the trough through one of the side walls above the bottom, an endless chain trained over the sprockets and longitudinally within said trough for movement in a rectilinear path within the trough and above the bottom thereof, longitudinally spaced transversely extending upstanding cross bars carried by the chain for movement thereby below the sprockets and in contact with the bottom for scraping the bottom, flanges on the upper edge of said trough partially extending inwardly and upwardly thereof for confining the material within said trough and means operatively connected to one of the sprockets for rotating it and driving the chain.

PAUL E. WAGNER.

References Cited in the file of this patent

UNITED STATES PATENTS

| Number | Name | Date |
|---|---|---|
| 333,585 | Barnard | Jan. 5, 1886 |
| 365,171 | Dodge | June 21, 1887 |
| 853,652 | Steele | May 14, 1907 |
| 871,469 | Bliedung | Nov. 19, 1907 |
| 1,093,305 | Anderson | Apr. 14, 1914 |
| 1,800,814 | Boldt | Apr. 14, 1931 |
| 2,155,874 | Sinden | Apr. 25, 1939 |
| 2,277,039 | Sinden | Mar. 24, 1942 |
| 2,383,932 | Brunner | Sept. 4, 1945 |
| 2,589,706 | Kitson et al. | Mar. 18, 1952 |

FOREIGN PATENTS

| Number | Country | Date |
|---|---|---|
| 347,828 | Great Britain | May 7, 1931 |

OTHER REFERENCES

Automatic Poultry Feeder Plan, Progress Report #2, September 1948, The Pennsylvania State College, School of Agriculture.